(12) United States Patent
Liu

(10) Patent No.: US 11,906,856 B2
(45) Date of Patent: Feb. 20, 2024

(54) DISPLAY PANEL AND DISPLAY DEVICE

(71) Applicant: TCL CHINA STAR OPTOELECTRONICS TECHNOLOGY CO., LTD., Guangdong (CN)

(72) Inventor: Jing Liu, Shenzhen (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 852 days.

(21) Appl. No.: 16/963,833

(22) PCT Filed: Jul. 8, 2020

(86) PCT No.: PCT/CN2020/100816
§ 371 (c)(1),
(2) Date: Jul. 22, 2020

(87) PCT Pub. No.: WO2021/227224
PCT Pub. Date: Nov. 18, 2021

(65) Prior Publication Data
US 2023/0091803 A1    Mar. 23, 2023

(30) Foreign Application Priority Data
May 12, 2020 (CN) .......................... 202010395388.5

(51) Int. Cl.
*G02F 1/1343* (2006.01)
*G02F 1/1362* (2006.01)
*G02F 1/1337* (2006.01)

(52) U.S. Cl.
CPC .. *G02F 1/134345* (2021.01); *G02F 1/136222* (2021.01); *G02F 1/133707* (2013.01)

(58) Field of Classification Search
None
See application file for complete search history.

(56) References Cited

U.S. PATENT DOCUMENTS

| | | | |
|---|---|---|---|
| 2008/0030636 A1 | 2/2008 | Huang | |
| 2008/0204613 A1 | 8/2008 | Kim | |

FOREIGN PATENT DOCUMENTS

| | | |
|---|---|---|
| CN | 101109880 A | 1/2008 |
| CN | 102667595 A | 9/2012 |
| CN | 102736305 A | 10/2012 |
| CN | 202563216 U | 11/2012 |
| CN | 102854662 A | 1/2013 |
| CN | 105807511 A | 7/2016 |
| CN | 107529626 A | 1/2018 |
| KR | 20200033523 A | 3/2020 |

*Primary Examiner* — Richard H Kim
(74) *Attorney, Agent, or Firm* — PV IP PC; Wei Te Chung; Ma Zhigang

(57) ABSTRACT

A display panel and a display device are provided. The display panel includes an array substrate, a color filter substrate disposed opposite to the array substrate, and a liquid crystal layer disposed between the color filter substrate and the array substrate. Through applying voltages at different partitions on a side of a color filter substrate, liquid crystal molecules have different deflection angles at different voltage parts, which can arrange the liquid crystal molecules in multiple directions on a vertical plane, ensuring high aperture ratio, and improving display viewing angles of the display device while increasing alignment domains.

8 Claims, 4 Drawing Sheets

DISPLAY PANEL AND DISPLAY DEVICE

CROSS-REFERENCE TO RELATED APPLICATIONS

This is the U.S. National Stage of International Patent Application No. PCT/CN2020/100816 filed Jul. 8, 2020, which in turn claims the benefit of Chinese Patent Application No. 202010395388.5 filed May 12, 2020.

FIELD OF INVENTION

The present disclosure relates to the field of display technologies, and more particularly, to a display panel and a display device.

BACKGROUND OF INVENTION

In order to meet market demands and to improve product competitiveness, thin film transistor liquid crystal displays (TFT-LCDs) are developing toward a high resolution, high contrast, high aperture ratio, high brightness, and wide viewing angles. At present, vertical alignment (VA) panels usually adopt a multi-domain alignment method, that is, defining alignment protrusions or slits on a thin film transistor (TFT) array substrate or a color filter (CF) substrate to orient liquid crystal molecules toward multiple directions on a horizontal plane, thereby obtaining a plurality of different alignment domains and meeting a requirement of wide viewing angles. In addition, to further improve viewing angles, arrangement directions of the liquid crystal molecules on a vertical plane also need to be increased. For example, by dividing a 4-domain pixel electrode on a side of a TFT into two independent areas and applying different voltages thereon, four alignment domains will increase to be eight alignment domains. However, to realize applying a voltage to partitions of the pixel electrode on the side of the TFT needs to add additional TFTs (a sub-TFT and a sharing-TFT), which will reduce pixel aperture ratio.

Technical problem: an embodiment of the present disclosure provides a display panel and a display device to orient liquid crystal molecules toward multiple directions on the vertical plane and prevent to reduce aperture ratio.

SUMMARY OF INVENTION

An embodiment of the present disclosure provides a display panel which includes:
an array substrate including a plurality of sub-pixels;
a color filter substrate disposed opposite to the array substrate and provided with a first pixel electrode, wherein the first pixel electrode has at least two voltage parts insulated from each other in an area corresponding to each of the sub-pixels, and there is a voltage difference between the at least two voltage parts; and
a liquid crystal layer disposed between the color filter substrate and the array substrate.

In some embodiments, the at least two voltage parts include a first voltage part and a second voltage part, and the first voltage part is disposed surrounding the second voltage part.

In some embodiments, the at least two voltage parts include a plurality of first voltage parts and a plurality of second voltage parts, and the first voltage parts and the second voltage parts are arranged alternatingly along a first direction.

In some embodiments, the sub-pixels have length sides and width sides perpendicular to each other, the first direction is parallel to the length sides, and the sub-pixels correspond to same voltage parts at junctions of the width sides.

In some embodiments, the sub-pixels have length sides and width sides perpendicular to each other, the first direction is parallel to the width sides, and the sub-pixels correspond to same voltage parts at junctions of the length sides.

In some embodiments, the sub-pixels correspond to the first voltage parts at junctions perpendicular to the first direction.

In some embodiments, the sub-pixels correspond to the first voltage parts at junctions perpendicular to the first direction.

In some embodiments, the array substrate is provided with a second pixel electrode, a gray-scale voltage is applied to the second pixel electrode, the first pixel electrode applies a first voltage to the first voltage parts and applies a second voltage to the second voltage parts, when the gray-scale voltage is a negative gray-scale voltage, the second voltage is a negative voltage, and when the gray-scale voltage is a positive gray-scale voltage, the second voltage is a positive voltage.

In some embodiments, a voltage difference between the first voltage and the second voltage ranges from 2V to 5V.

In some embodiments, a voltage value of the first voltage ranges from 0V to 3V and a voltage value of the second voltage ranges from 2V to 5V, or the voltage value of the first voltage ranges from −3V to 0V and the voltage value of the second voltage ranges from −5V to −2V.

An embodiment of the present disclosure provides a display device including a display panel. The display panel includes:
an array substrate including a plurality of sub-pixels;
a color filter substrate disposed opposite to the array substrate and provided with a first pixel electrode, wherein the first pixel electrode has at least two voltage parts insulated from each other in an area corresponding to each of the sub-pixels, and there is a voltage difference between the at least two voltage parts; and
a liquid crystal layer disposed between the color filter substrate and the array substrate.

In some embodiments, the at least two voltage parts include a first voltage part and a second voltage part, and the first voltage part is disposed surrounding the second voltage part.

In some embodiments, the at least two voltage parts include a plurality of first voltage parts and a plurality of second voltage parts, and the first voltage parts and the second voltage parts are arranged alternatingly along a first direction.

In some embodiments, the sub-pixels have length sides and width sides perpendicular to each other, the first direction is parallel to the length sides, and the sub-pixels correspond to same voltage parts at junctions of the width sides.

In some embodiments, the sub-pixels have length sides and width sides perpendicular to each other, the first direction is parallel to the width sides, and the sub-pixels correspond to same voltage parts at junctions of the length sides.

In some embodiments, the sub-pixels correspond to the first voltage parts at junctions perpendicular to the first direction.

In some embodiments, the sub-pixels correspond to the first voltage parts at junctions perpendicular to the first direction.

In some embodiments, the array substrate is provided with a second pixel electrode, a gray-scale voltage is applied to the second pixel electrode, the first pixel electrode applies a first voltage to the first voltage parts and applies a second voltage to the second voltage parts, when the gray-scale voltage is a negative gray-scale voltage, the second voltage is a negative voltage, and when the gray-scale voltage is a positive gray-scale voltage, the second voltage is a positive voltage.

In some embodiments, a voltage difference between the first voltage and the second voltage ranges from 2V to 5V.

In some embodiments, a voltage value of the first voltage ranges from 0V to 3V and a voltage value of the second voltage ranges from 2V to 5V, or the voltage value of the first voltage ranges from −3V to 0V and the voltage value of the second voltage ranges from −5V to −2V.

Beneficial effect: a display panel provided by the embodiments of the present disclosure includes an array substrate, a color filter substrate, and a liquid crystal layer. There are a plurality of sub-pixels disposed on the array substrate. The color filter substrate is disposed opposite to the array substrate and is provided with a first pixel electrode, the first pixel electrode has at least two voltage parts insulated from each other in an area corresponding to each of the sub-pixels, and there is a voltage difference between the at least two voltage parts. The liquid crystal layer is disposed between the color filter substrate and the array substrate. Through disposing at least two voltage parts which are insulated from each other in an area of the first pixel electrode corresponding to the each of the sub-pixels and there being the voltage difference between the at least two voltage parts, liquid crystal molecules can deflect toward multiple angles on a vertical plane without reducing aperture ratio and alignment domains can be increased.

DESCRIPTION OF DRAWINGS

The accompanying figures to be used in the description of embodiments of the present disclosure will be described in brief to more clearly illustrate the technical solutions of the embodiments. The accompanying figures described below are only part of the embodiments of the present disclosure, from which those skilled in the art can derive further figures without making any inventive efforts.

DETAILED DESCRIPTION OF PREFERRED EMBODIMENTS

Figure 1:
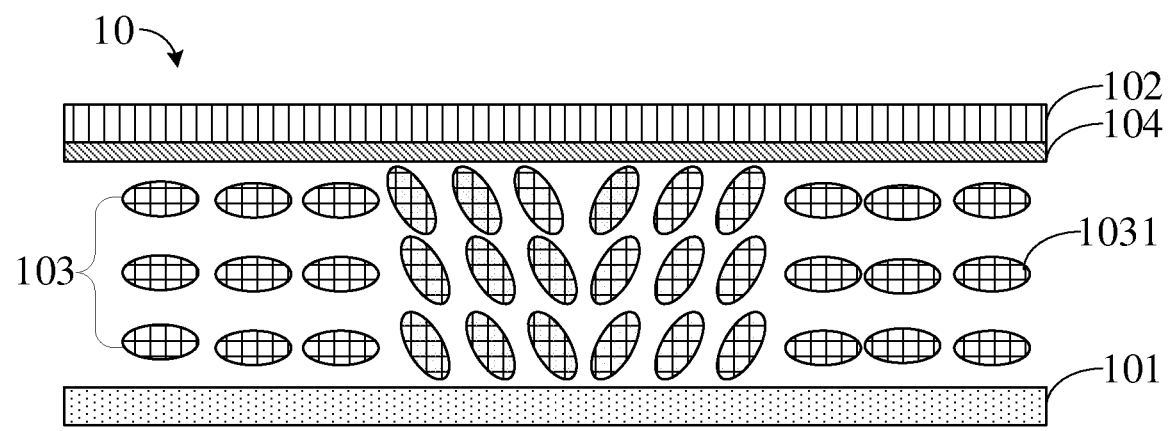
FIG. 1 is a first schematic structural diagram of a display panel according to an embodiment of the present disclosure.

The technical solutions in the embodiments of the present disclosure will be clearly and completely described below with reference to the drawings in the embodiments of the present disclosure. Obviously, the described embodiments are only a part of the embodiments of the present disclosure, but not all the embodiments. Based on the embodiments in the present disclosure, all other embodiments obtained by those skilled in the art without creative efforts are within the scope of the present disclosure.

It should be noted that in the description of the present disclosure, it should be understood that terms such as "upper", "lower", "front", "rear", "left", "right", "inside", "outside", as well as derivative thereof should be construed to refer to the orientation as described or as shown in the drawings under discussion. These relative terms are for convenience of description, do not require that the present disclosure be constructed or operated in a particular orientation, and shall not be construed as causing limitations to the present disclosure.

An embodiment of the present disclosure provides a display panel and a display device. The following will describe the display panel in detail.

Figure 2:
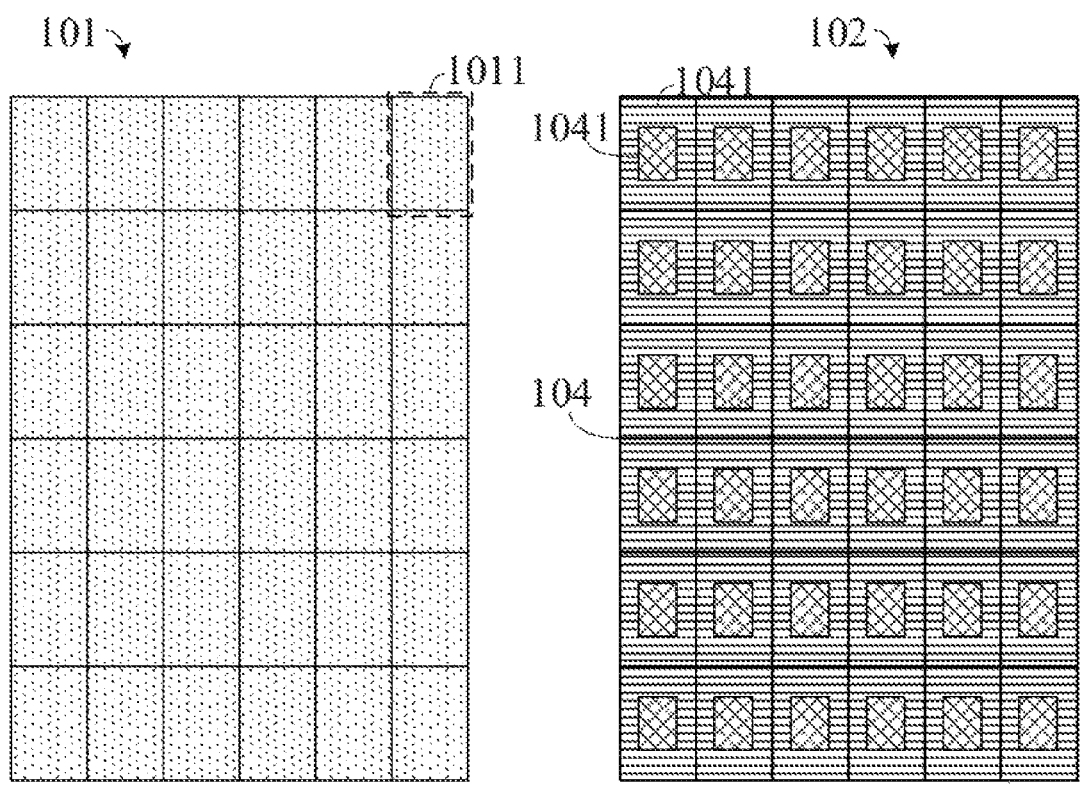
FIG. 2 is a first schematic structural diagram of an array substrate and a color filter substrate according to an embodiment of the present disclosure.

Referring to FIGS. 1 and 2, FIG. 1 is a first schematic structural diagram of a display panel 10 according to an embodiment of the present disclosure, and FIG. 2 is a first schematic structural diagram of an array substrate 101 and a color filter substrate 102 according to an embodiment of the present disclosure. The display panel 10 includes an array substrate 101, a color filter substrate 102, and a liquid crystal layer 103. There are a plurality of sub-pixels 1011 disposed on the array substrate 101. The color filter substrate 102 is disposed opposite to the array substrate 101 and is provided with a first pixel electrode 104, the first pixel electrode 104 has at least two voltage parts 1041 insulated from each other in an area corresponding to each of the sub-pixels 1011, and there is a voltage difference between the voltage parts 1041. The liquid crystal layer 103 is disposed between the color filter substrate 102 and the array substrate 101. Arrangement directions of liquid crystal molecules 1031 in FIG. 1 are only schematic, and actually, the liquid crystal molecules 1031 deflect toward multiple directions on a vertical plane of each sub-pixel 1011 area. For example, the liquid crystal molecules 1031 in an area corresponding to one voltage part 1041 deflect and are oriented at 90° from the array substrate 101, and the liquid crystal molecules 1031 in an area corresponding to another voltage part 1041 deflect and are oriented at 45° from the array substrate 101. Specific deflection angles of the liquid crystal molecules 1031 are related to applied voltages, the above is just an example, and as long as the liquid crystal molecules 1031 deflect at different angles corresponding to different voltage parts 1041, they are all within the scope of protection of this application. In the embodiment of the present disclosure, the at least two voltage parts 1041 insulated from each other are disposed in the area of the first pixel electrode 104 corresponding to each of the sub-pixels 1011, wherein there is the voltage difference between the at least two voltage parts 1041. Through applying voltages at different partitions on a side of a color filter substrate 102, the liquid crystal molecules 1031 have different deflection angles corresponding to different areas having different voltage parts, which allows the liquid crystal molecules 1031 to deflect at a plurality of angles on a vertical plane, preventing a need to add additional transistors on a side of the array substrate 101, ensuring high aperture ratio, and improving the display viewing angle of the display device while increasing alignment domains, thereby widening the liquid crystal display device's viewing angle display effect.

Figure 3:
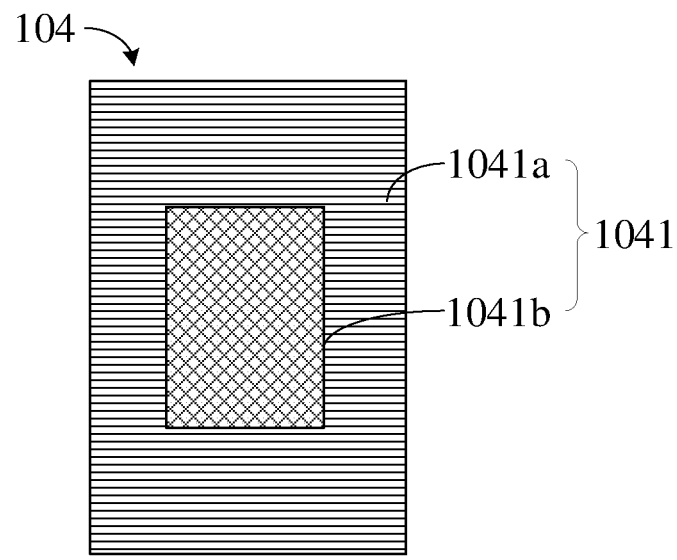
FIG. 3 is a partial schematic structural diagram of a first pixel electrode according to an embodiment of the present disclosure.

Wherein, referring to FIG. 3, FIG. 3 is a partial schematic structural diagram of the first pixel electrode 104 according to an embodiment of the present disclosure. FIG. 3 shows the first pixel electrode 104 which corresponds to one sub-pixel 1011 area. One of the voltage parts 1041 includes a first voltage part 1041a and a second voltage part 1041b, and the first voltage part 1041a is disposed surrounding the second voltage part 1041b. Partitioning voltage using such a method can accurately control the liquid crystal molecules 1031 in each sub-pixel 1011 area, making deflection areas of the liquid crystal molecules 1031 more accurate and adapting to display panels having different sizes and requirements.

Figure 4:
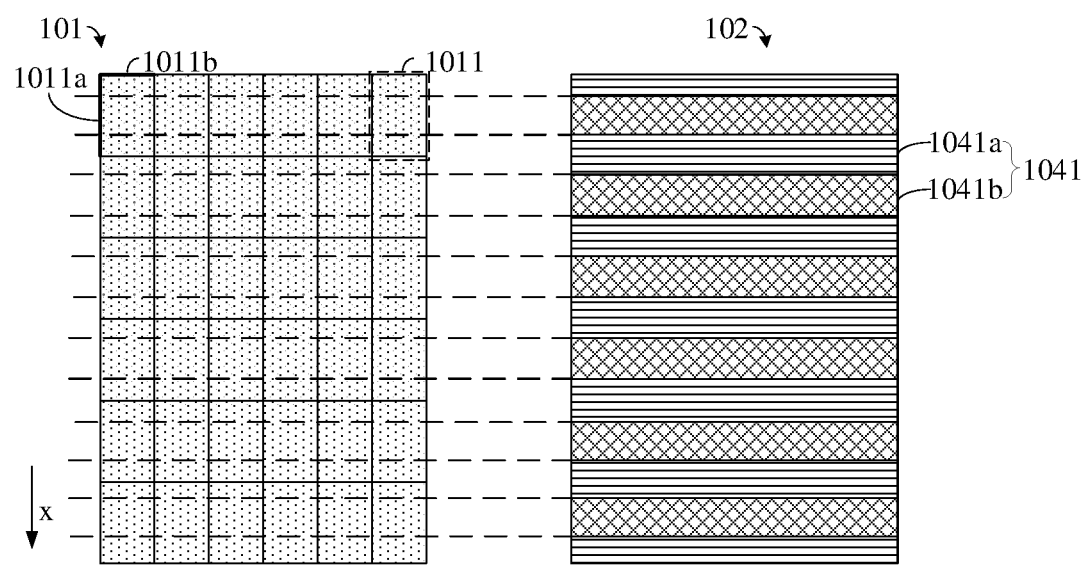
FIG. 4 is a second schematic structural diagram of an array substrate and a color filter substrate according to an embodiment of the present disclosure.

Referring to FIG. 4, FIG. 4 is a second schematic structural diagram of an array substrate 101 and a color filter substrate 102 according to an embodiment of the present disclosure. Voltage parts 1041 include a plurality of first voltage parts 1041a and a plurality of second voltage parts 1041b, and the first voltage parts 1041a and the second voltage parts 1041b are arranged alternatingly along a first direction, wherein the first direction is an extending direction along an x axis in FIG. 4. The x axis direction in FIG. 4 is only used as an example to more intuitively explain an arrangement of the first voltage parts 1041a and the second voltage parts 1041b in the embodiment of the present disclosure, and is not intended to limit the present disclosure.

Sub-pixels 1011 have length sides 1011a and width sides 1011b perpendicular to each other, the first direction is parallel to the length sides 1011a, and the sub-pixels 1011 correspond to same voltage parts at junctions of the width sides 1011b.

Figure 5:
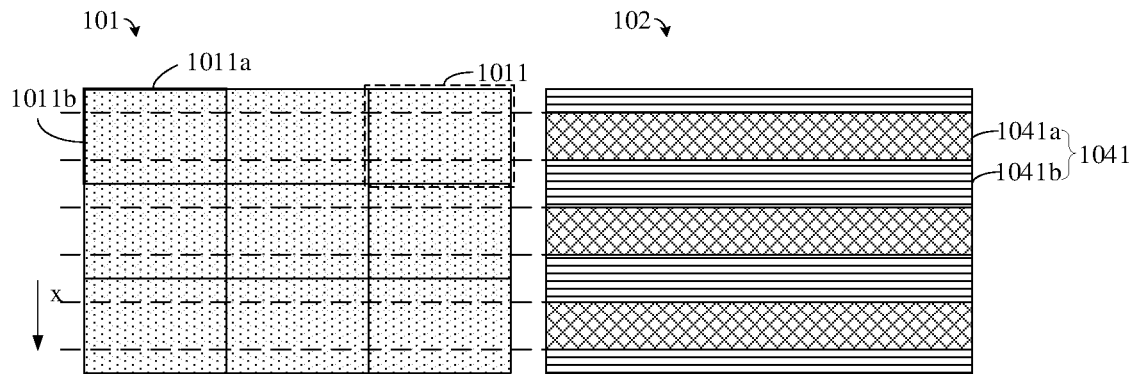
FIG. 5 is a third schematic structural diagram of an array substrate and a color filter substrate according to an embodiment of the present disclosure.

Referring to FIG. 5, FIG. 5 is a third schematic structural diagram of an array substrate 101 and a color filter substrate 102 according to an embodiment of the present disclosure. Sub-pixels 1011 have length sides 1011a and width sides 1011b perpendicular to each other, a first direction is parallel to the width sides 1011b, and the sub-pixels 1011 correspond to same voltage parts at junctions of the length sides 1011a. The first direction is an extending direction along an x axis in FIG. 5. The x axis direction in FIG. 5 is also only an example.

The partitioning method used by the above embodiments divides the first pixel electrode 104 into parallel portions and into at least two voltage parts 1041 corresponding to each row or each column of the sub-pixels 1011 to arrange the liquid crystal molecules 1031 in the sub-pixels 1011 areas into multi-angle deflections. This method can more easily adjust the liquid crystal molecules 1031 in the sub-pixels 1011 areas by partitioning the voltage, which has a simple operation and high production efficiency. In addition, having the sub-pixels 1011 correspond to the same voltage parts 1041 at the junctions can reduce a number of divisions of the first pixel electrode 104, and a production process can be simplified.

Wherein, the first pixel electrode 104 is partitioned by laser cutting. The laser cutting method is simple and convenient to operate, with fast cutting speeds and high precision, which can improve the production efficiency and ensure product yield.

Figure 6:
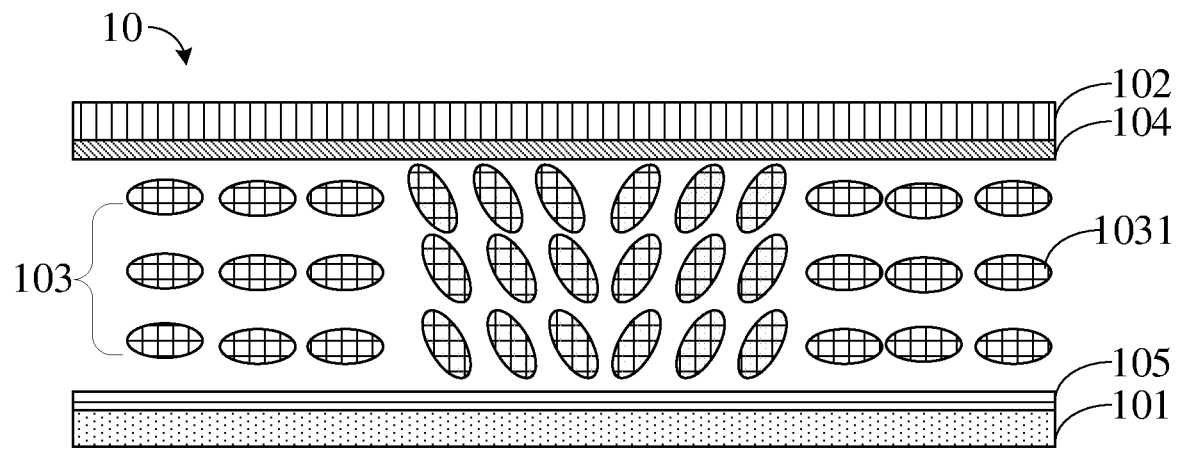
FIG. 6 is a second schematic structural diagram of a display panel according to an embodiment of the present disclosure.

Referring to FIG. 6, FIG. 6 is a second schematic structural diagram of a display panel 10 according to an embodiment of the present disclosure. The array substrate 101 is provided with a second pixel electrode 105, a gray-scale voltage is applied to the second pixel electrode 105, the first pixel electrode 104 applies a first voltage to the first voltage parts 1041a and applies a second voltage to the second voltage part 1041b, when the gray-scale voltage is a negative gray-scale voltage, the second voltage is a negative voltage, and when the gray-scale voltage is a positive gray-scale voltage, the second voltage is a positive voltage.

Wherein, a voltage difference between the first voltage and the second voltage ranges from 2V to 5V. Specifically, the voltage difference between the first voltage and the second voltage is 2V, 3V, 4V, or 5V.

Wherein, a voltage value of the first voltage ranges from 0V to 3V and a voltage value of the second voltage ranges from 2V to 5V, or the voltage value of the first voltage ranges from −3V to 0V and the voltage value of the second voltage ranges from −5V to −2V. Following specific examples are provided for the voltage values of the first voltage and the second voltage.

Example 1, the voltage value of the first voltage is 0V, and the voltage value of the second voltage is 2V.

Example 2, the voltage value of the first voltage is 0V, and the voltage value of the second voltage is −2V.

Example 3, the voltage value of the first voltage is 3V, and the voltage value of the second voltage is 5V.

Example 4, the voltage value of the first voltage is 0V, and the voltage value of the second voltage is 5V.

The above voltage values are only examples, which are not intended to limit the present disclosure. Wherein, as mentioned above, a polarity of the second voltage is determined according to a polarity of the gray-scale voltage. The voltage values of the first voltage and the second voltage are to meet different sizes of sub-pixels 1011 or different liquid crystal display requirements, which can be adjusted depending on different display panels to obtain suitable display viewing angles.

Wherein, the sub-pixels 1011 correspond to the first voltage parts 1041a at junctions perpendicular to the first direction. The first voltage parts 1041a apply the first voltage, and the first voltage is not necessary to be set according to the gray-scale voltage. Since the first voltage parts 1041a are disposed at the junctions of the sub-pixels 1011, the second voltage is adjusted to arrange the liquid crystal molecules 1031 in centers of the sub-pixels 1011 to have multi-angle deflections and to better meet the display panel's wide viewing angle display.

Figure 7:
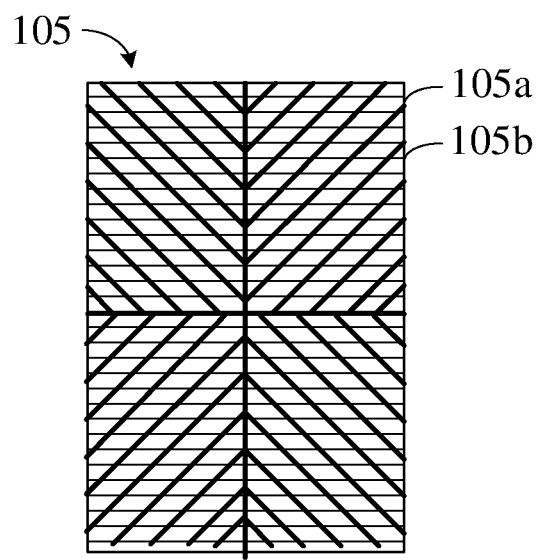
FIG. 7 is a partial schematic structural diagram of a second pixel electrode according to an embodiment of the present disclosure.

Referring to FIG. 7, FIG. 7 is a partial schematic structural diagram of the second pixel electrode 105 according to an embodiment of the present disclosure. FIG. 7 shows the second pixel electrode 105 which corresponds to one sub-pixel 1011 area. Alignment protrusions 105a or slits 105b in at least four directions are disposed at intervals on the second pixel electrode corresponding to the sub-pixel 1011 area to make the liquid crystal molecules 1031 arranged toward multiple directions on a horizontal plane to obtain a plurality of different alignment domains. The disposition direction in FIG. 7 is only an example, and is not a limitation on an arrangement method of liquid crystal alignment on the side of the array substrate of the present disclosure. Disposing the alignment protrusions 105a or slits 105b on the side of the array substrate can arrange the liquid crystal molecules 1031 toward multiple directions on the horizontal plane, for example, arranged along a direction of the alignment protrusions 10a or slits 105b. Combined with the partitioned voltages on the color filter substrate 102 side, the liquid crystal molecules 1031 can obtain the alignment domains in at least eight directions. Therefore, the liquid crystal molecules 1031 in each sub-pixel area can achieve a multi-domain alignment on the vertical and horizontal directions, thereby achieving a wider viewing angle display of the display panel. In addition, achieving the multi-domain alignment through combing the partitioned voltages on the side of the color filter substrate 102 will not affect the aperture ratio of the display panel and will not add other devices, thereby obtaining a display panel with high resolution, high contrast, high aperture ratio, high brightness, and wide viewing angles.

Figure 8:
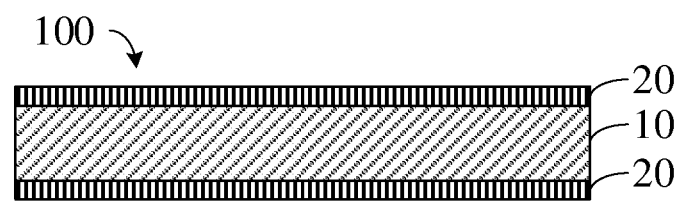
FIG. 8 is a schematic structural diagram of a display device according to an embodiment of the present disclosure.

An embodiment of the present disclosure provides a display device 100, and FIG. 8 is a schematic structural diagram of the display device 100 according to an embodiment of the present disclosure. Wherein, the display device 100 includes the above-mentioned display panel 10 and polarizers 20, and the display device 100 can also include other devices. The polarizers 20 and other devices in the embodiment of the present disclosure and installation thereof are related techniques which are well-known by the skilled in the art, which will not be described in detail herein.

The display device 100 provided in the embodiment of the present disclosure includes the display panel 10 and the polarizers 20, and the display panel 10 includes the array substrate, the color filter substrate disposed opposite to the array substrate, and the liquid crystal layer disposed between the color filter substrate and the array substrate. By applying voltages at different partitions on the side of the color filter substrate, the liquid crystal molecules have different deflection angles at different voltage parts, which allows the liquid crystal molecules to be arranged in multiple directions on the vertical plane, eliminating a need to add additional transistors on the side of the array substrate, ensuring high aperture ratio, and improving the display viewing angle of the display device while increasing the alignment domains, thereby making the liquid crystal display device have the wide viewing angle display effect.

The display panel and the display device provided by the embodiment of the present disclosure are described in detail above. The specific examples are applied in the description to explain the principle and implementation of the disclosure. The description of the above embodiments is only for helping to understand the technical solution of the present disclosure and its core ideas. Meanwhile, for those skilled in the art, the range of specific implementation and application may be changed according to the ideas of the present disclosure. In summary, the content of the specification should not be construed as causing limitations to the present disclosure.

What is claimed is:

1. A display panel, comprising:
    an array substrate comprising a plurality of sub-pixels;
    a color filter substrate disposed opposite to the array substrate and provided with a first pixel electrode, wherein the first pixel electrode has at least two voltage parts insulated from each other in an area corresponding to each of the sub-pixels, and there is a voltage difference between the at least two voltage parts; and
    a liquid crystal layer disposed between the color filter substrate and the array substrate,
    wherein the at least two voltage parts comprise a first voltage part and a second voltage part, and the first voltage part is disposed surrounding the second voltage part.

2. The display panel according to claim 1, wherein the array substrate is provided with a second pixel electrode,
    a gray-scale voltage is applied to the second pixel electrode,
    the first pixel electrode applies a first voltage to the first voltage part and applies a second voltage to the second voltage part, and
    when the gray-scale voltage is a negative gray-scale voltage, the second voltage is a negative voltage, and when the gray-scale voltage is a positive gray-scale voltage, the second voltage is a positive voltage.

3. The display panel according to claim 2, wherein a voltage difference between the first voltage and the second voltage ranges from 2V to 5V.

4. The display panel according to claim 3, wherein a voltage value of the first voltage ranges from 0V to 3V and a voltage value of the second voltage ranges from 2V to 5V, or
    the voltage value of the first voltage ranges from −3V to 0V and the voltage value of the second voltage ranges from −5V to −2V.

5. A display device comprising a display panel, wherein the display panel comprises:
    an array substrate comprising a plurality of sub-pixels;
    a color filter substrate disposed opposite to the array substrate and provided with a first pixel electrode, wherein the first pixel electrode has at least two voltage parts insulated from each other in an area corresponding to each of the sub-pixels, and there is a voltage difference between the at least two voltage parts; and
    a liquid crystal layer disposed between the color filter substrate and the array substrate,
    wherein the at least two voltage parts comprise a first voltage part and a second voltage part, and the first voltage part is disposed surrounding the second voltage part.

6. The display device according to claim 5, wherein the array substrate is provided with a second pixel electrode,
    a gray-scale voltage is applied to the second pixel electrode,
    the first pixel electrode applies a first voltage to the first voltage part and applies a second voltage to the second voltage part, and
    when the gray-scale voltage is a negative gray-scale voltage, the second voltage is a negative voltage, and when the gray-scale voltage is a positive gray-scale voltage, the second voltage is a positive voltage.

7. The display device according to claim 6, wherein a voltage difference between the first voltage and the second voltage ranges from 2V to 5V.

8. The display device according to claim 7, wherein a voltage value of the first voltage ranges from 0V to 3V and a voltage value of the second voltage ranges from 2V to 5V, or
    the voltage value of the first voltage ranges from −3V to 0V and the voltage value of the second voltage ranges from −5V to −2V.

* * * * *